US010785188B2

(12) United States Patent
Nguyen et al.

(10) Patent No.: US 10,785,188 B2
(45) Date of Patent: Sep. 22, 2020

(54) DOMAIN NAME PROCESSING SYSTEMS AND METHODS

(71) Applicant: Proofpoint, Inc., Sunnyvale, CA (US)

(72) Inventors: Harold Nguyen, Burlingame, CA (US); Ali Mesdaq, San Jose, CA (US); Kevin Dedon, Austin, TX (US); Michael Fox, Lago Vista, TX (US); Gaurav Dalal, Fremont, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 291 days.

(21) Appl. No.: 15/986,585

(22) Filed: May 22, 2018

(65) Prior Publication Data

US 2019/0364011 A1 Nov. 28, 2019

(51) Int. Cl.
*H04L 29/12* (2006.01)
*G06F 16/9535* (2019.01)

(52) U.S. Cl.
CPC ...... *H04L 61/2046* (2013.01); *G06F 16/9535* (2019.01); *H04L 61/1511* (2013.01)

(58) Field of Classification Search
CPC ............. G06F 16/9535; H04L 61/1511; H04L 61/3025
USPC ....................................................... 709/245
See application file for complete search history.

(56) References Cited

U.S. PATENT DOCUMENTS

| 7,548,652 | B1 * | 6/2009 | Ahrens | ............. G06F 16/90344 382/229 |
| 7,559,085 | B1 | 7/2009 | Wahl | |
| 8,005,782 | B2 | 8/2011 | Reznik et al. | |
| 8,041,662 | B2 | 10/2011 | Reznik et al. | |
| 8,631,498 | B1 | 1/2014 | Hart et al. | |
| 8,949,251 | B2 | 2/2015 | Thomas | |
| 9,053,320 | B2 | 6/2015 | Thomas | |

(Continued)

OTHER PUBLICATIONS

Piredda P. et al., Deepsquatting: Learning-Based Typosquatting Detection at Deeper Domain Levels. In: Esposito F., Basili R., Ferilli S., Lisi F. (eds) AI*IA 2017 Advances in Artificial Intelligence. AI*IA 2017. Lecture Notes in Computer Science, vol. 10640. Springer, Cham. pp. 347-358. (Year: 2017).*

(Continued)

*Primary Examiner* — Tonia L Dollinger
*Assistant Examiner* — Jonathan A Sparks
(74) *Attorney, Agent, or Firm* — Sprinkle IP Law Group

(57) ABSTRACT

Disclosed is a domain filter capable of determining an n-gram distance between a seed domain and each of a plurality of candidate domains. The domain filter loads a seed domain n-gram for the seed domain and a candidate domain n-gram for each candidate domain in memory, compares the seed domain n-gram and the candidate domain n-gram to identify any identical grams, removes any identical grams from the seed domain n-gram, and determines how many grams are left in the seed domain n-gram, representing the n-gram distance between the seed domain and the candidate domain. The domain filter then compares n-gram distances thus determined with a predetermined threshold, eliminates any candidate domain having an n-gram distance from the seed domain that exceeds the predetermined threshold, and provides remaining candidate domains to a downstream computing facility such as a user interface or an analytical module operating in an enterprise computing environment.

20 Claims, 6 Drawing Sheets

(56) References Cited

U.S. PATENT DOCUMENTS

| | | | |
|---|---|---|---|
| 9,135,396 B1* | 9/2015 | Kalinin | G06F 16/285 |
| 9,218,334 B2 | 12/2015 | Mugali, Jr. et al. | |
| 9,479,524 B1 | 10/2016 | Hagen | |
| 9,692,771 B2 | 6/2017 | Dinerstein et al. | |
| 2013/0254179 A1 | 9/2013 | Tan | |
| 2015/0278188 A1 | 10/2015 | Aras et al. | |
| 2015/0302053 A1 | 10/2015 | Mitnick et al. | |
| 2016/0055490 A1 | 2/2016 | Keren et al. | |
| 2018/0027013 A1* | 1/2018 | Wright | H04L 63/1416 726/23 |
| 2019/0222589 A1* | 7/2019 | Kislitsin | H04L 63/1416 |

OTHER PUBLICATIONS

Sahoo, D. et al., "Malicious URL Detection using Machine Learning: A Survey," 2017, arXiv preprint arXiv:1701.07179, 21 pgs.

Marchal, Samuel, "Proactive Discovery of Phish-ing Related Domain Names," Research in Attacks, Intrusions, and Defenses, Sep. 2012, Amsterdam, Netherlands, Springer, 7462, pp. 190-209.

\* cited by examiner

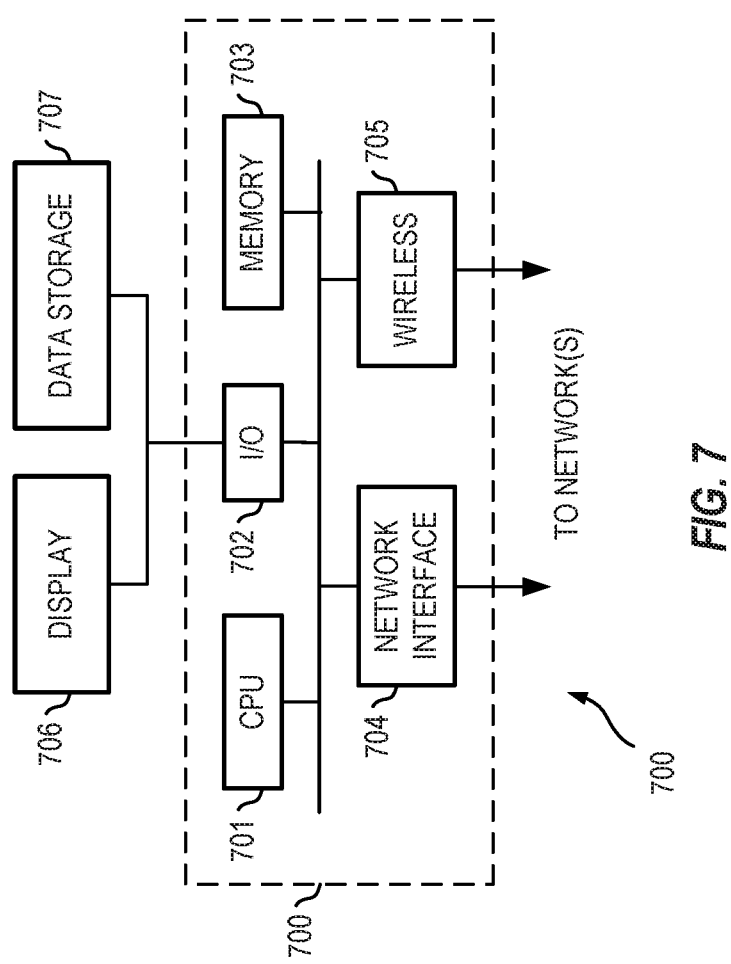

DOMAIN NAME PROCESSING SYSTEMS AND METHODS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to the field of digital risk detection. More particularly, this disclosure relates to high-efficiency domain name processing systems and methods useful for quickly and efficiently identifying domains for digital risk analysis and detection, with significantly reduced time and computational power that otherwise would be required to process an enormous number of domains on the Internet.

BACKGROUND OF THE RELATED ART

Trademark dilution refers to a trademark law concept giving the owner of a famous trademark standing to forbid others from using that mark in a way that would lessen its uniqueness. Unfortunately, with the advent of the Internet, it has become extremely difficult to spot potential trademark infringers, not the least of which is due to the sheer number of domains on the Internet.

Currently, there are about three hundred million registered domains on the Internet. New domain names are added to this number on a daily basis. In this case, a "domain name" may generally include an identification string that defines a realm of administrative autonomy, authority or control within the Internet. Domain names, which may also be referred to as "domains" herein, may be formed by the rules and procedures of the Domain Name System (DNS).

Domain names are organized in subordinate levels (subdomains) of the DNS root domain, which is nameless. The first-level set of domain names are the top-level domains (TLDs), including the generic top-level domains (gTLDs), such as the prominent domains com, info, net, edu, and org, and the country code top-level domains (ccTLDs).

Today, domain names are widely used to establish a unique identity. For example, organizations may choose a domain name that corresponds to their name (or brand), helping Internet users to reach them easily. In this context, a brand can be a name, trademark, term, design, symbol, or other feature that distinguishes an entity (e.g., organization, product, etc.) from its rivals or competitors in the eyes of others (e.g., consumers).

To confuse end users and/or profit from the goodwill of a certain domain, brand, or trademark belonging to someone else, attackers may try to register domain names that are similar to that certain brand, domain, or trademark. Those domain names may often contain the name of the brand or a word similar to the brand name. Another tactic that may be used by attackers is including one or more auxiliary terms in the domain that are connected to the brand but not derived from the brand name. For example, a spoofed domain for a bank may also include the words "financial" or "investment." As another example, a spoofed domain for a brand may include other trademarks of the brand.

However, looking for a spoofed domain from hundreds of millions of domains on the Internet is akin to looking for a needle in a haystack. Consequently, there is room for technical innovations and improvements.

SUMMARY

Embodiments disclosed herein provide systems and methods implementing a novel domain processing solution (referred to herein as a "domain filter") that can quickly and efficiently filter down registered domains that can be found on the Internet (referred to herein as "candidate domains") against domains of interest (referred to herein as "seed domains"). A seed domain can be any domain of interest that is the subject of domain protection (e.g., from trademark dilution, domain fraud, etc.).

The domain filter is operable to process a seed domain and each candidate domain into n-grams. In the fields of computational linguistics and probability, an n-gram is a contiguous sequence of n items from a given sample of text or speech. An n-gram of size 1 is referred to as a "unigram." An n-gram of size 2 is referred to as a "bi-gram." In some embodiments, the domain filter is operable to process a character string for a seed domain and a character string for each candidate domain into bi-grams.

The domain filter is further operable to compare the n-gram of each candidate domain to that of the seed domain. However, rather than finding the number of grams that match, the domain filter is operable to find the number of grams left over from the matching. A metric referred to as "n-gram distance" is created to record the difference. A powerful benefit of this approach is that the domain filter can identify (isolate) only domains that are interestingly related to a seed domain and not just domains that share similar n-grams.

In some embodiments, a method for processing domains may include determining an n-gram distance between a seed domain and each candidate domain of a plurality of candidate domains, the determining performed by a domain filter running on a computing device having a computer memory. In some embodiments, the determining may comprise loading seed domain n-gram for the seed domain and candidate domain n-gram for the candidate domain in the computer memory, comparing the seed domain n-gram and the candidate domain n-gram to identify any identical grams in the seed domain n-gram and the candidate domain n-gram, removing any identical grams from the seed domain n-gram in the computer memory, and counting a number of grams left in the candidate domain n-gram after the removing, the number representing the n-gram distance between the seed domain and the each candidate domain. The n-gram distance may be stored in association with the seed domain and the candidate domain.

In some embodiments, the method can be performed for each of a plurality of seed domains. That is, each seed domain is compared with the plurality of candidate domains to obtain the n-gram distance between the seed domain and each of the plurality of candidate domains.

In some embodiments, the domain filter may be run on a mobile device, a laptop computer, or a tablet computer. The domain filter may access a seed domain database to retrieve a seed domain name for the seed domain and generate original seed domain n-gram from a character string of the seed domain name. At runtime, the domain filter may make a copy of the original seed domain n-gram and load the copy in a computer memory for each n-gram computation against a candidate domain.

In some embodiments, the method may further include comparing n-gram distances determined by the domain filter with a predetermined threshold; eliminating, from the plurality of candidate domains, any candidate domain having an n-gram distance from the seed domain that exceeds the predetermined threshold; and providing candidate domains left from the eliminating to a downstream computing facility. The downstream computing facility can include, for instance, a user interface (UI), an edit distance analyzer, or an analytical module running on a computer operating in an enterprise computing environment.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7 depicts a diagrammatic representation of a data processing system for implementing a system according to some embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As alluded above, currently, there are hundreds of millions of domains on the Internet. Thus, whenever there is a need to process (e.g., classify, categorized, etc.) domains on the Internet, a huge cost in time and money is needed to process all of them. To reduce the number of domains that would need to be processed, a domain filter is needed to avoid unnecessary machine computation. For example, suppose a digital risk detection system analyzes over 300 million domains every day. It would be extremely time-consuming and costly (e.g., in terms of computational resources and money) to process every single domain of the 300 million domains on a daily basis.

Further complicating the matter is that each of the 300 million domains may be processed at least twice, once in a lab or test environment and once in a production environment, bringing the total number of domains under analysis to over half a billion. Suppose it takes one second for a human to look at the domain and decide how the domain is to be classified, it will take that person more than 15 years to classify all of over half a billion domains. Using machines can reduce the processing time to a 24-hour period, for example, by using a distance metric such as edit distance or Levenshtein Distance to find similarity. However, this is a very expensive computation.

Additionally, there have been attempts to generate typosquatting-type domains. However, these methods are also very expensive in terms of time, computational power, and costs. Currently, there are no effective and efficient first-pass domain filters on the market.

To this end, embodiments disclosed herein provide domain processing systems and methods that can quickly and efficiently filter down candidate domains against seed domains. An example of a domain processing system 180 is illustrated in FIG. 1.

Figure 1:
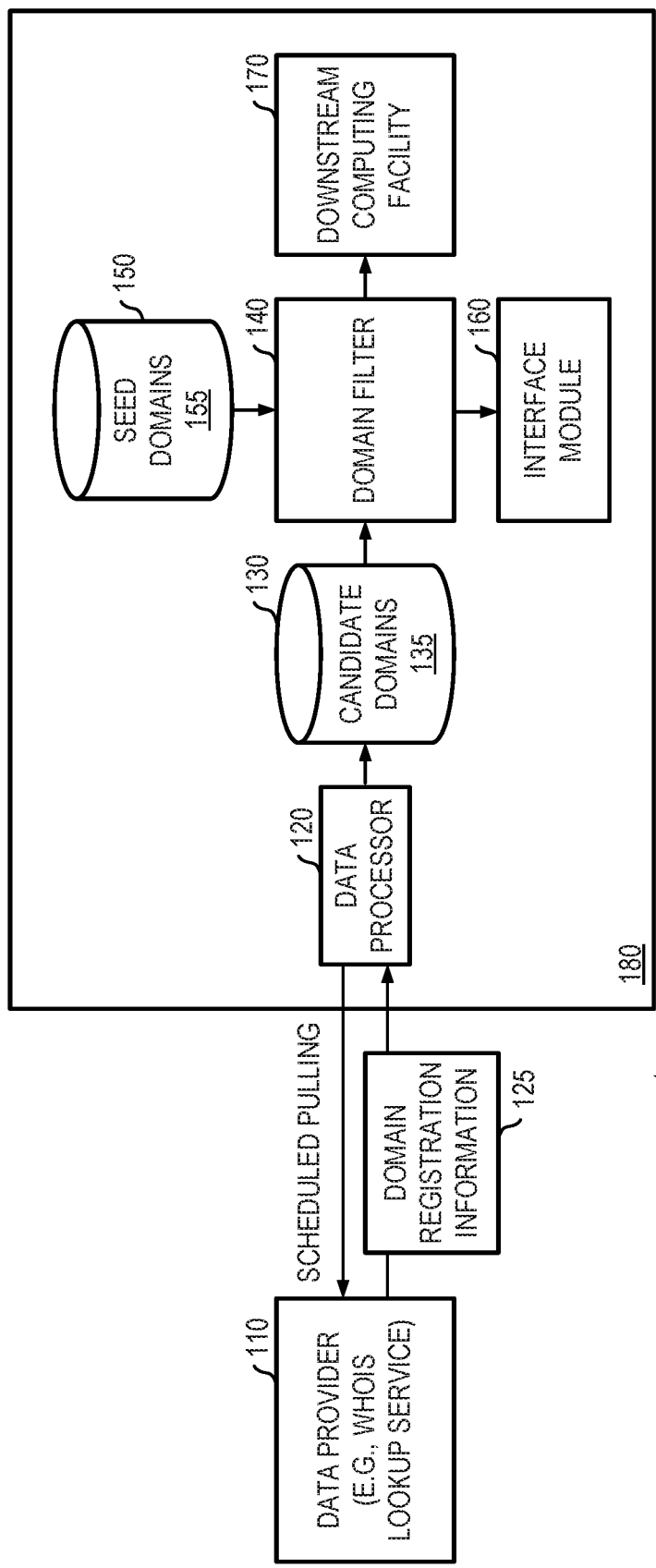
FIG. 1 depicts a diagrammatic representation of a computing environment where embodiments disclosed herein can be implemented.

In the example of FIG. 1, domain processing system 180 is communicatively connected to a data provider 110. Data provider 110 may provide a "WHOIS" lookup service in a network environment 100. WHOIS is a query and response protocol that can be used for querying databases that store the registered users or assignees of an Internet resource, such as a domain name, an IP address block, or an autonomous system.

Domain processing system 180 may include a data processor 120 that is configured for pulling or requesting data provider 110 on a configurable time interval. In response, data provider 110 may return domain registration information 125 containing key-value pairs, a portion of which is provided below.

{"standardRegCreatedDateOriginal": "2017-09-11 00:00:00 UTC",
"technicalContact_email": "", "registrant_telephone": "",
"billingContact_organization": "", "status": "addPeriod",
"whoisServer": "whois.nic.fr", "zoneContact_telephoneExt": "",
"nameServers": "", "administrativeContact_telephoneExt": "", -continued

```
"billingContact_email": "", "registrarInfo": "1&1 Internet SE",
"registrant_state": "", "zoneContact_name": "",
"administrativeContact_postalCode": "", "zoneContact_state": "",
"billingContact_country": "", "billingContact_postalCode": "",
"zoneContact_organization": "", "registrant_email": "",
"registrant_rawText": "", "contactEmail": "",
"administrativeContact_country": "FRANCE", "updatedDateOriginal":
"", "technicalContact_telephone": "", "billingContact_telephone": "",
"Audit_auditUpdatedDate": "2017-09-12", "zoneContact_street2": "",
"standardRegUpdatedDateOriginal": "", "billingContact_rawText": "",
"registrarName": "", "zoneContact_telephone": "",
"zoneContact_country": "", "registrant_name": "",
"billingContact_faxExt": "", "registrant_telephoneExt": "",
"standardRegUpdatedDate": "", "technicalContact_street1": "",
"technicalContact_fax": "", "zoneContact_street3": "",
"technicalContact_state": "", "expiresDateOriginal": "11/09/2018",
"technicalContact_postalCode": "", "WhoisRecord_rawText": "",
"registrant_country": "FRANCE", "registrant_faxExt": "",
"zoneContact_faxExt": "", "zoneContact_email": "",
"administrativeContact_email": "", "registrant_city": "",
"billingContact_telephoneExt": "", "RegistryData_rawText": "%%|%%
This is the AFNIC Whois server.|%%|%% complete date format :
DD/MM/YYYY|%% short date format :      DD/MM|%% version
: FRNIC-2.5|%%|%%
Rights restricted by copyright. |%% See
https://www.afnic.fr/en/products-and-services/services/whois/whois-
special-notice/|%%|%% Use '-h' option to obtain more information about
this service. |%%|%% [213.87.240.199 REQUEST] >> startmynet.fr|
%%|%% RL Net [##########] - RL IP
[#########.] |%%||domain:       domainname.fr|status:
ACTIVE ...",
...}
```

Data processor 120 is operable to process domain registration information 125 provided by data provider 110 to extract the universal resource locators (URLs) and store the URLs as candidate domains 135 in an Internet domain database 130. In some cases, in addition to URLs, other information such as the registrant's name, company, email address, etc. may also be extracted from domain registration information 125 and stored in Internet domain database 130.

In some embodiments, data processor 120 can query data provider 110 for all the registered domains on the Internet. In some embodiments, data processor 120 can query data provider 110 for any new domain registered since the last pulling (i.e., getting the delta). Querying data provider 110 can be done based on a configurable time schedule, for example, on a daily basis.

In some embodiments, Internet domain database 130 may implement a relational database system. In some embodiments, Internet domain database 130 may implement an Apache Cassandra™ database available from the Apache Software Foundation.

In some embodiments, domain filter 140 is operable to review candidate domains 135 stored in Internet domain database 130 (e.g., on a configurable time interval such as daily) against one or more seed domains 155 stored in a seed domain database 150. In one embodiment, domain filter 140 is operable to review 300 million candidate domains stored in Internet domain database 130 on a daily basis against a set of seed domains. In one embodiment, domain filter 140 is operable to review the delta (e.g., about 20,000 URLs) received from data provider 110 on a daily basis against a set of seed domains. For each seed domain 155, domain filter 140 is operable to filter down the number of candidate domains 135 that might be considered as similar or close based on a novel metric referred to herein as an "n-gram distance."

As discussed further below, in some embodiments, domain filter 140 is operable to compare the n-gram of each candidate domain 135 to the n-gram of seed domain 155. However, rather than using the number of grams that match, domain filter 140 utilizes the number of grams left over in the n-gram of seed domain 155 from the matching. The number is the n-gram distance between seed domain 155 and a particular candidate domain 135. In some embodiments, this n-gram distance is stored in a computer memory in association with seed domain 155 and the particular candidate domain 135.

In some embodiments, domain filter 140 can perform an n-gram distance thresholding process by comparing n-gram distances thus determined with a predetermined threshold. In some embodiments, candidate domains 135 that have an n-gram distance larger than the predetermined threshold are dropped or otherwise eliminated and only candidate domains 135 that have an n-gram distance that matches the predetermined threshold or that is less than the predetermined threshold are provided to a downstream computing facility 170 and/or presented to a user through a UI generated by an interface module 160.

In some embodiments, domain processing system 180 may operate on a computer operating in an enterprise computing environment or on multiple computers in a distributed computing environment. For example, domain filter 140 may be embodied on a mobile device, a laptop computer, a tablet computer, or any suitable data processing system, while data processor 120, Internet domain database 130, interface module 160, seed domain database 150, and downstream computing facility 170 may be embodied on the same or different computers separate from domain filter 140. In such a distributed computing environment, seed domain database 150 may reside on a server machine. In such a case, domain filter 140 may obtain a seed domain 155 from seed domain database 150 over a secure network connection (e.g., over a private network).

Figure 2:
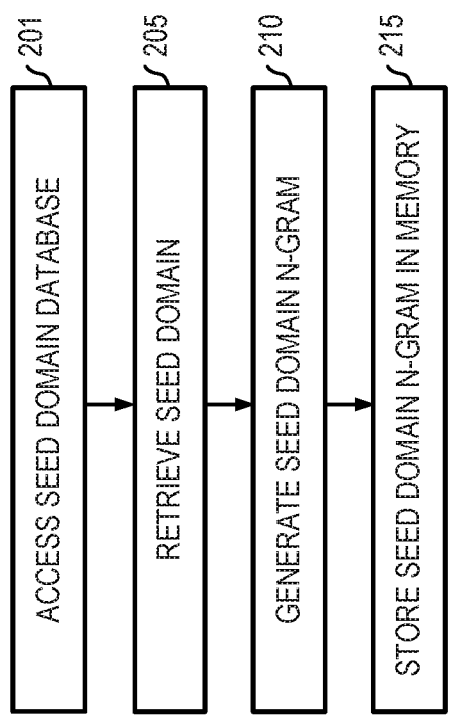
FIG. 2 is a flow chart illustrating a process for generating a seed domain n-gram according to some embodiments.

FIG. 2 is a flow chart illustrating a process for generating a seed domain n-gram according to some embodiments. Referring to FIG. 1, in some embodiments, domain filter 140 may process, in a computer memory, a set of candidate domains 135 against each seed domain 155 stored in seed domain database 150. This processing can be referred to as a job (e.g., a scheduled processor job for processing a seed domain). Accordingly, in FIG. 2, a job 200 may include accessing a seed domain database (201), retrieving a seed domain (e.g., an URL) from the seed domain database (205), generating a n-gram for the seed domain thus retrieved (210), and storing the n-gram thus generated in a computer memory (e.g., of a mobile device, a laptop computer, or a tablet computer). The URL may include a character string which can contain text, number(s), or a combination thereof (i.e., alphanumerical). Every time job 200 kicks off, an n-gram is created in the computer memory for a seed domain.

Figure 3:
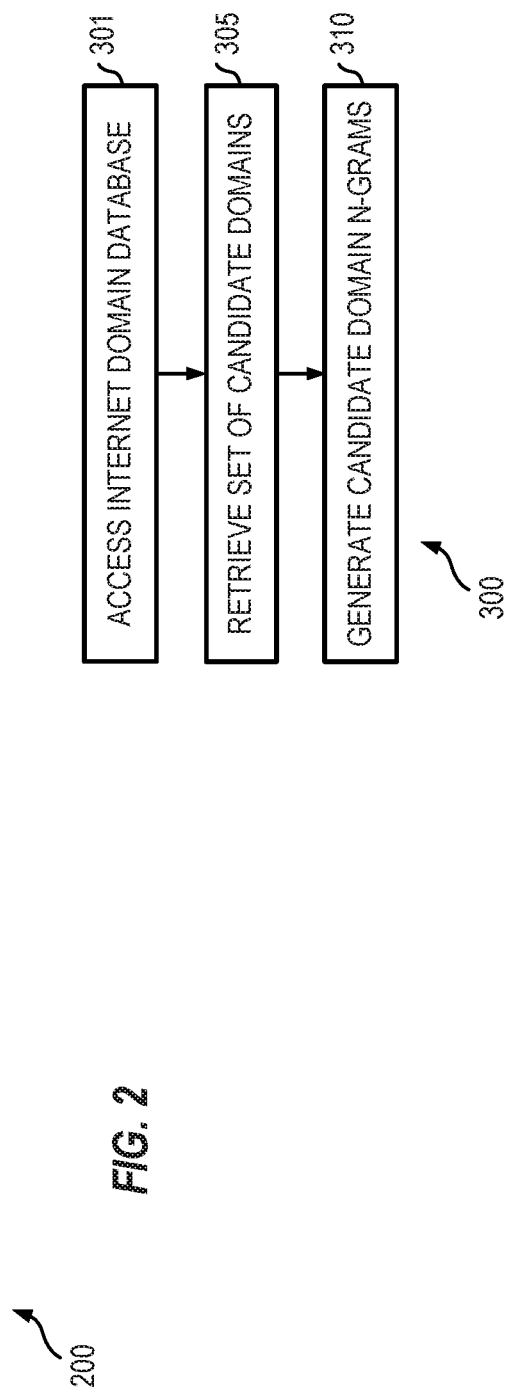
FIG. 3 is a flow chart illustrating a process for generating candidate domain n-grams according to some embodiments.

FIG. 3 is a flow chart illustrating a process for generating candidate domain n-grams according to some embodiments. In the example of FIG. 3, a job 300 may include accessing an Internet domain database (301), retrieving a block or set of candidate domains from the Internet domain database (305), and generating an n-gram for each candidate domain thus retrieved (310). In some embodiments, retrieving a block or set of candidate domains from the Internet domain database may entail reading character strings stored in a block of rows (e.g., rows 1-100) of the Internet domain database. In some embodiments, job 300 may take place concurrently with job 200, or job 200 may take place before job 300 so that n-grams for seed domains can be created and stored in the computer memory before job 300 is started.

Figure 4:
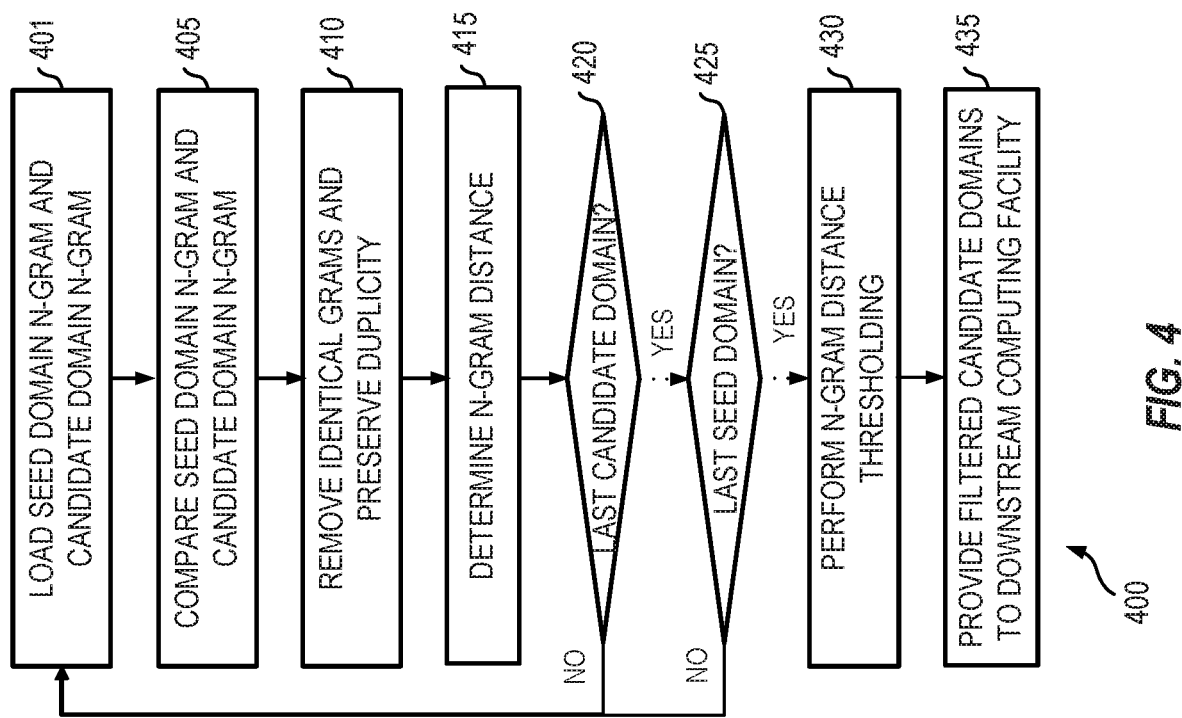
FIG. 4 is a flow chart illustrating an example of a domain processing method according to some embodiments.

FIG. 4 is a flow chart illustrating an example of a domain processing method 400 according to some embodiments. Skilled artisans understand that there are many ways that a candidate domain can be similar to a seed domain. For example, a candidate domain may contain a seed domain or is some version or variation of the seed domain. As an example, suppose a seed domain is "myecompany.com," candidate domains may contain the seed domain "mycompany.com," for instance, "mmycompany.com," "mycompany.net," etc. in their names. As another example, some candidate domains may use "3" to substitute the letter "e" in a domain name, or use the number "1" or the letter "l" for an uppercase "i." These substitutes and alterations cannot be easily identified.

Suppose a seed domain is "wellsfarm.com" and a candidate domain is "w3llsfarm.com" (e.g., an URL or character string retrieved from Internet domain database 130 discussed above). In this example, a domain filter implementing method 400 makes use of n-gram where n=2 and, per job 200, first breaks the seed domain into its bi-gram: (w,e), (e,l), (l,l), (l,s), . . . , (o,m). The bi-gram is stored in the computer memory. Then, per job 300, the domain filter also breaks the candidate domain into its bi-gram: (w,3), (3,l), (l, l), (l, s), . . . , (o, m) and store them in the computer memory.

The domain filter then makes a copy of the bi-gram for the seed domain and stores the copy in the computer memory. In this way, the domain filter will not need to regenerate bi-gram for the seed domain each time it computes an n-gram distance between the seed domain and a candidate domain. Instead, each time a job is started, it makes a copy of the bi-gram for the seed domain and loads the copy of the bi-gram in the computer memory (401). The domain filter then uses the copy of the bi-gram to compute an n-gram distance between the seed domain and a candidate domain, as explained below.

More specifically, the domain filter takes a gram (also referred to as a word, e.g., (w,e)) of the seed domain (e.g., "wellsfarm.com") and compares that gram with all the grams of a candidate domain (405). This comparing step is repeated for each gram of the seed domain (e.g., compare (e,l) against all the grams in the bi-gram of the candidate domain, then compare (l,l) against all the grams in the bi-gram of the candidate domain, and so on).

Suppose the domain filter compares two bi-grams, one of the seed domain and another of the candidate domain, and determines that they share the same grams except for the first two. Grams that are exactly the same are removed, although duplicity is preserved (410). Duplicity may occur when there are two of the same grams in a bi-gram. Preserving duplicity means that any duplicate in the same bi-gram is not automatically deleted from the bi-gram. For example, if (o,o) shows up twice in a bi-gram of a seed domain and also shows up once in a bi-gram of a candidate domain, only one (o,o) is deleted from the bi-gram of the seed domain, thus preserving the duplicity of (o,o).

Once the bi-gram of the seed domain under processing has no gram identical to any gram in the bi-gram of the candidate domain, there can be zero or more grams left in the bi-gram of the seed domain in the computer memory. The n-gram distance can then be determined based on the number (zero or more) of grams left over when the seed domain is subtracted from the candidate domain under consideration (415). In this case, what is left is the difference between the seed domain and the candidate domain under consideration. Thus, the more grams are removed from the n-gram of a seed domain, the smaller the n-gram distance is between the seed domain and a candidate domain under consideration and the smaller the n-gram distance, the closer the distance between the two under comparison and the more related the candidate domain is to the seed domain. No normalization is needed to process the seed domain and the candidate domain and determine the n-distance between them.

In some embodiments, the domain filter can preserve the order of grams in a bi-gram of a seed domain under processing. This can be done by forcing the removal of any identified shared/matching grams from the bi-gram of the seed domain only if they are in the correct order relative to the original seed domain bi-gram.

At runtime, the domain filter is operable to process all the candidate domains under consideration relative to the seed domain as described above (420). This process can be reiterated for each of a plurality of seed domains (425).

Following the above example, below is a summary of n-gram distances on all the candidate domains under consideration relative to the seed domain "wellsfarm.com":
-- Results:
Total: 777 candidate domains (URLs)
Largest distance: 4
URLs that have 0 n-gram distance: 253
URLs that have 1 n-gram distance: 175
URLs that have 2 n-gram distance: 179
URLs that have 3 n-gram distance: 122
URLs that have 4 n-gram distance: 48

In this example, the n-gram distance is never more than 4. Of the 777 candidate domains, 253 of them have a 0 n-gram distance from the seed domain. A 0 n-gram distance means that the seed domain is identical or within a candidate domain.

In some embodiments, each n-gram distance is stored in the computer memory. In some embodiments, when the n-gram distance between a seed domain and a candidate domain exceeds a predefined, predetermined, or preconfigured threshold, then the candidate domain is dropped from further processing or otherwise eliminated, e.g., from the computer memory (430). In some embodiments, when the n-gram distance between a seed domain and a candidate domain matches or is less than the threshold, then the candidate domain is kept. This is referred to as n-gram distance thresholding. The candidate domains that remain after the domain filter applied the n-gram distance thresholding can then be provided by the domain filter to a computing facility downstream from the domain filter (435). Examples of a downstream computing facility can include, but are not limited to, a UI of domain processing system 180 that is generated by interface module 160 and presented on a user device, an edit distance analyzer that computes edit distance or Levenshtein Distance to determine a degree of similarity between a seed domain and a filtered candidate domain, an analytical module running on a computer operating in an enterprise computing environment that is operable to analyze the seed domain and the filtered candidate domain, and so on.

In some embodiments, candidate domains 135 stored in Internet domain database 130 can include real domains (e.g., registered domains) and test domains (e.g., registered or unregistered domains for testing purposes). Test domains may be created based on variations of a seed domain that someone may obtain as domains. In some embodiments, an appropriate threshold can be determined by calculating the n-gram distances between the seed domain and the test domains. In some embodiments, an appropriate threshold can be determined by a domain or subject matter expert in view of the n-gram distances between the seed domain and the test domains. A threshold thus determined and be stored in a database local to the domain filter. In some embodiments, the same threshold can be used in domain filtering across all seed domains. In some embodiments, different thresholds can be used in domain filtering for different seed domains.

Every time the domain filter compares an n-gram of a seed domain and an n-gram of a candidate domain, it makes a copy of the n-gram of the seed domain. Multiple threads (jobs) can be running in the computer memory to process the seed domain bigram against multiple candidate domains. In some embodiments, all the domain filtering operations are done in the computer memory.

In the above example, as the n-gram distance increases, the number of candidate domains decreases. This is not always the case. For comparison, below are the results when comparing the n-gram of the seed domain "wellsfarm.com" and those of a huge set of registered.com TLDs regardless of whether they are relevant to the seed domain "wellsfarm.com":

Total: 127896625 URLs
Largest distance: 10
URLs that have 0 n-gram distance: 269
URLs that have 1 n-gram distance: 1388
URLs that have 2 n-gram distance: 312
URLs that have 3 n-gram distance: 482
URLs that have 4 n-gram distance: 2167
URLs that have 5 n-gram distance: 23547
URLs that have 6 n-gram distance: 228136
URLs that have 7 n-gram distance: 1549942
URLs that have 8 n-gram distance: 7842577
URLs that have 9 n-gram distance: 33143285
URLs that have 10 n-gram distance: 85104520

As the example above illustrates, it is also possible that, as the n-gram distance increases, the number of candidate domains also increases. Further, as this example illustrates, the domain filter effectively has shrunk the number of hits to a few thousands, as opposed to over a hundred million.

Figure 5:
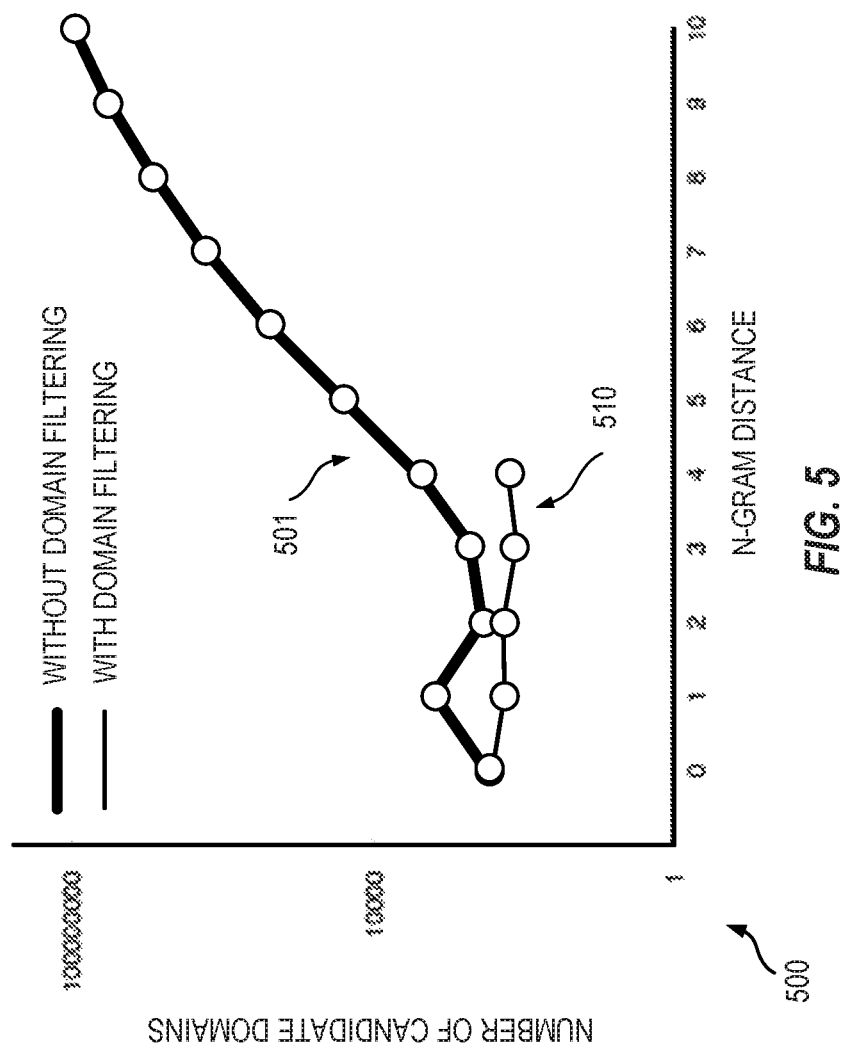
FIG. 5 is a plot diagram showing a significant reduction in the number of candidate domains resulted from domain filtering.

The above two examples can be plotted in a diagram 500 shown in FIG. 5. Comparing an unfiltered set of candidate domains 501 and a set of filtered set of candidate domains 510 relative to their n-gram distances, it can be seen that the domain filter can significantly reduce the number of candidate domains for a downstream computing facility.

To put this significant reduction in perspective, referring to FIG. 1, suppose domain processing system 180 can ingest about 300 million domains per day, and the delta from data provider 110 is about 20,000. That is, on average, the domain filter may encounter about 20,000 newly added domains per day. Compared to the method of calculating Levenshtein distance for each seed domain and each candidate domain, the time saving by the domain filter can be on the order of about one magnitude. In other words, the domain filter can perform at least ten times faster using the n-gram distance domain processing method described above than using the Levenshtein distance method.

Below is an example of computing, using an edit distance technique alone on a laptop computer across one million registered TLDs from the previous dataset:
real 1m56.379s
user 1m35.680s
sys 0m1.759s By comparison, the domain filter can compute, on the same laptop computer, only n-gram distance across the same dataset:
real 0m13.174s
user 0m13.145s
sys 0m0.025s In this case, the improvement in speed is almost one order of magnitude. Considering the cost of calculating an edit distance on every word, which is very computationally expensive, the domain filter is an effective and efficient solution to domain filtering that can significantly reduce time and cost of resources.

In some embodiments, the domain filter can significantly reduce the time and cost of resources needed by a downstream computing facility. Accordingly, in some embodiments, the domain filter can be used as a pre-processor in a domain ingestion and detection pipeline.

In such a domain ingestion and detection pipeline, the domain filter can be implemented as the first module that processes candidate domains against a seed domain, determines n-gram distances, and filter the candidate domains based on their n-gram distances using a predetermined threshold. The candidate domains that met the threshold can be passed onto to a downstream computing facility in the domain ingestion and detection pipeline.

In the domain ingestion and detection pipeline, in addition to the domain filter, there can be a series of modules that filter the significantly reduced list of candidate domains further down. An example of this process 600 is illustrated in FIG. 6.

Figure 6:
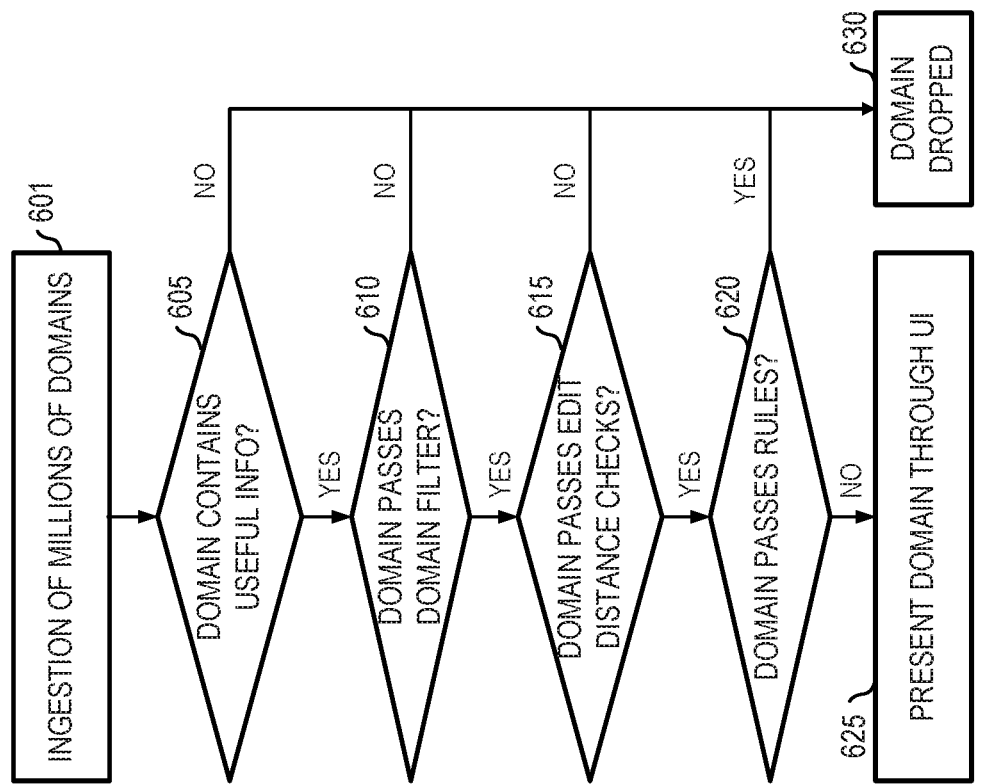
FIG. 6 is a flow chart illustrating an example of a domain ingestion and detection method with domain filtering according to some embodiments.

In FIG. 6, millions of domains are ingested (e.g., through the WHOIS input data) into the domain ingestion and detection pipeline (601). The input data can go through a formality check to make sure that the information contained in the input data is indeed useful to the system (605). If the format for the input data is incorrect (e.g., it cannot be read, it is empty, or it contains unnecessary fields), it is dropped (630). If the input data passes the formality check, it is passed onto the domain filter (610). Domains that do not pass the domain filter are dropped (630). Domains that do pass the domain filter are provided to an edit distance module (615). The edit distance module can use techniques such as Levenshtein distance, bitsquatting, homoglyphs and "l33t speak", confusables, transposition, keyboard proximity, vowel swap, repetition and hyphenation normalization to discern whether a seed domain is related to a candidate domain and thus is worth further processing. This is referred to as edit distance checks. Domains that pass the edit distance checks are passed to a social engineering module (620). The social engineering module is operable to apply social engineering rules to the domains and determine whether common key terms (e.g., social engineering terms) are more likely to trigger false-positives. The social engineering module may segment words in a domain and determine whether there are whitelist terms to reduce F false-positives. The social engineering terms can be determined by clustering techniques. In some embodiments, the social engineering terms can provide a feedback loop to the domain filter so that the next time the domain containing the social engineering terms will not pass the domain filter. The domains that do not pass the social engineering rules are dropped (630). The domains that do pass the social engineering rules can be presented on a UI (625).

One of the modules in the domain ingestion and detection pipeline can create features around a candidate domain outputted from the domain filter. Examples of features can include an indication on whether a seed domain is contained in the candidate domain, what is the edit distance (which represents how many characters that must be replaced, added, or inserted into a candidate domain in order to change it to the candidate domain), etc. Each module can analyze the candidate domain and set flags.

In this way, the domain filter can quickly and significantly reduce the number of candidate domains that the domain ingestion and detection pipeline usually would have to analyze and process to determine how similar they actually are to the seed domain. Since the analytics are computationally expensive, reducing the number of candidate domains can significantly reduce the computational power needed to process candidate domains and increase the efficiency of the domain ingestion and detection pipeline.

FIG. 7 depicts a diagrammatic representation of a data processing system for implementing a system for domain filtering. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
    determining an n-gram distance between a seed domain and each candidate domain of a plurality of candidate domains, the determining performed by a domain filter running on a computing device having a computer memory, the determining comprising:
        loading a seed domain n-gram for the seed domain and a candidate domain n-gram for the each candidate domain in the computer memory;
        comparing the seed domain n-gram and the candidate domain n-gram to identify any identical grams in the seed domain n-gram and the candidate domain n-gram;
        removing any identical grams from the seed domain n-gram in the computer memory; and
        counting a number of grams left in the seed domain n-gram in the computer memory after the removing, the number representing the n-gram distance between the seed domain and the each candidate domain;
    comparing n-gram distances determined by the domain filter with a predetermined threshold;
    eliminating, from the plurality of candidate domains, any candidate domain having an n-gram distance from the seed domain that exceeds the predetermined threshold; and
    providing candidate domains left from the eliminating to a downstream computing facility.

2. The method according to claim 1, further comprising: performing the determining for each of a plurality of seed domains.

3. The method according to claim 1, further comprising:
    accessing a seed domain database;
    retrieving a seed domain name for the seed domain from the seed domain database, the seed domain name comprising a character string;
    generating an original seed domain n-gram from the character string; and
    storing the original seed domain n-gram in the computer memory of the computing device, wherein the loading comprises making a copy of the original seed domain n-gram and storing the copy in the computer memory.

4. The method according to claim 3, wherein the computing device comprises a mobile device, a laptop computer, or a tablet computer, wherein the seed domain database resides on a server machine operating in an enterprise computing environment and wherein the retrieving comprises obtaining the seed domain name for the seed domain from the seed domain database over a secure network connection.

5. The method according to claim 1, further comprising:
accessing an Internet domain database;
retrieving candidate domain names for the plurality of candidate domains from the Internet domain database, each candidate domain name comprising a character string; and
generating the candidate domain n-gram from the character string.

6. The method according to claim 1, wherein the downstream computing facility comprises a user interface, an edit distance analyzer, or an analytical module running on a computer operating in an enterprise computing environment.

7. The method according to claim 1, wherein the computing device comprises a mobile device, a laptop computer, or a tablet computer.

8. An apparatus, comprising:
a processor;
a computer memory; and
stored instructions translatable by the processor to perform:
determining an n-gram distance between a seed domain and each candidate domain of a plurality of candidate domains, the determining comprising:
loading a seed domain n-gram for the seed domain and a candidate domain n-gram for the each candidate domain in the computer memory;
comparing the seed domain n-gram and the candidate domain n-gram to identify any identical grams in the seed domain n-gram and the candidate domain n-gram;
removing any identical grams from the seed domain n-gram in the computer memory; and
counting a number of grams left in the seed domain n-gram in the computer memory after the removing, the number representing the n-gram distance between the seed domain and the each candidate domain;
comparing n-gram distances from the determining with a predetermined threshold;
eliminating, from the plurality of candidate domains, any candidate domain having an n-gram distance from the seed domain that exceeds the predetermined threshold; and
providing candidate domains left from the eliminating to a downstream computing facility.

9. The apparatus of claim 8, wherein the stored instructions are further translatable by the processor to perform the determining for each of a plurality of seed domains.

10. The apparatus of claim 8, wherein the stored instructions are further translatable by the processor to perform:
accessing a seed domain database;
retrieving a seed domain name for the seed domain from the seed domain database, the seed domain name comprising a character string;
generating an original seed domain n-gram from the character string; and
storing the original seed domain n-gram in the computer memory of the computing device, wherein the loading comprises making a copy of the original seed domain n-gram and storing the copy in the computer memory.

11. The apparatus of claim 10, wherein the apparatus comprises a mobile device, a laptop computer, or a tablet computer, wherein the seed domain database resides on a server machine operating in an enterprise computing environment and wherein the retrieving comprises obtaining the seed domain name for the seed domain from the seed domain database over a secure network connection.

12. The apparatus of claim 8, wherein the stored instructions are further translatable by the processor to perform:
accessing an Internet domain database;
retrieving candidate domain names for the plurality of candidate domains from the Internet domain database, each candidate domain name comprising a character string; and
generating the candidate domain n-gram from the character string.

13. The apparatus of claim 8, wherein the downstream computing facility comprises a user interface, an edit distance analyzer, or an analytical module running on a computer operating in an enterprise computing environment.

14. The apparatus of claim 10, wherein the apparatus comprises a mobile device, a laptop computer, or a tablet computer.

15. A computer program product comprising a non-transitory computer-readable medium storing instructions translatable by a computing device having a computer memory to perform:
determining an n-gram distance between a seed domain and each candidate domain of a plurality of candidate domains, the determining comprising:
loading a seed domain n-gram for the seed domain and a candidate domain n-gram for the each candidate domain in the computer memory;
comparing the seed domain n-gram and the candidate domain n-gram to identify any identical grams in the seed domain n-gram and the candidate domain n-gram;
removing any identical grams from the seed domain n-gram in the computer memory; and
counting a number of grams left in the seed domain n-gram in the computer memory after the removing, the number representing the n-gram distance between the seed domain and the each candidate domain;
comparing n-gram distances from the determining with a predetermined threshold;
eliminating, from the plurality of candidate domains, any candidate domain having an n-gram distance from the seed domain that exceeds the predetermined threshold; and
providing candidate domains left from the eliminating to a downstream computing facility.

16. The computer program product of claim 15, wherein the instructions are further translatable by the computing device to perform the determining for each of a plurality of seed domains.

17. The computer program product of claim 15, wherein the instructions are further translatable by the computing device to perform:
accessing a seed domain database;
retrieving a seed domain name for the seed domain from the seed domain database, the seed domain name comprising a character string;
generating an original seed domain n-gram from the character string; and
storing the original seed domain n-gram in the computer memory of the computing device, wherein the loading comprises making a copy of the original seed domain n-gram and storing the copy in the computer memory.

18. The computer program product of claim 15, wherein the computing device comprises a mobile device, a laptop computer, or a tablet computer, wherein the seed domain database resides on a server machine operating in an enterprise computing environment and wherein the retrieving comprises obtaining the seed domain name for the seed domain from the seed domain database over a secure network connection.

19. The computer program product of claim 15, wherein the instructions are further translatable by the computing device to perform:

accessing an Internet domain database;

retrieving candidate domain names for the plurality of candidate domains from the Internet domain database, each candidate domain name comprising a character string; and generating the candidate domain n-gram from the character string.

20. The computer program product of claim 15, wherein the downstream computing facility comprises a user interface, an edit distance analyzer, or an analytical module running on a computer operating in an enterprise computing environment.

\* \* \* \* \*